April 30, 1968  J. UNGAR ETAL  3,380,169
PIE AND CAKE DIVIDER
Filed Oct. 19, 1965

INVENTORS
JOSEPH UNGAR
ART MILLER
BY
Bushin & Goldfarb
ATTORNEYS

United States Patent Office 3,380,169
Patented Apr. 30, 1968

3,380,169
PIE AND CAKE DIVIDER
Joseph Ungar, 118 Coleridge St., Brooklyn, N.Y. 11235, and Art Miller, 8 Roosevelt Ave., Larchmont, N.Y. 10538
Filed Oct. 19, 1965, Ser. No. 498,008
1 Claim. (Cl. 33—174)

ABSTRACT OF THE DISCLOSURE

A pie and cake divider comprising a bifurcated tapered standard having a lower end for insertion into a pie and an upper end for clampingly holding a lower plate. The lower plate is semi-circular in shape, while the upper plate is also semi-circular in shape, both being provided with spacing ribs. The spacing ribs of the lower plate hold the lower plate above the pastry, while the spacer ribs of the upper plate facilitate rotation thereof above the lower plate.

---

This invention relates to a kitchen utensil and more particularly to a pie and cake divider.

The primary object of the present invention is to provide a kitchen utensil for use in conjunction with pies, cakes and like pastry for facilitating the cutting of predetermined portions of equal size.

When cutting or slicing a pie, cake or like pastries, it is often difficult to gauge by eye the size of the portion of pastry to be served, so that very often some of the slices are either smaller or larger than desirable. This invention avoids this difficulty by providing a kitchen utensil adapted to provide a guide for the cutting or dividing of a pie or cake into a predetermined number of equal-size portions.

A further object of the present invention resides in the provision of a pie and cake divider to be used in conjunction with a pie or cake which may be utilized in a manner so as not to seriously or adversely affect the overall appearance of the pastry by having a minimum contact with the pastry.

An additional object of the invention resides in the provision of a pie and cake divider which is provided with an arrangement of a vertical shaft so arranged so that a lower plate bearing suitable markings thereon may be clampingly held in fixed relation to the shaft, while the upper plate may be conveniently rotated with respect thereto, and wherein after a cut has been made on a portion of pie or cake, the entire device may be rotated to a position suitable for cutting the next successive portion.

Still further objects and features of this invention reside in the provision of a pie and cake divider which is simple in construction, capable of being mass produced by conventional methods of molding using various types of synthetic plastic materials, such as polystyrene, polyethylene, polypropylene, polyvinyl chloride or the like, yet which is sturdy and capable of being easily washed and cleaned.

These, together with the various ancillary objects and features of the present invention, which will become apparent as the following description proceeds, are attained by this pie and cake divider, preferred embodiments of which have been illustrated in the accompanying drawings, by way of example only, wherein.

Figure 1:
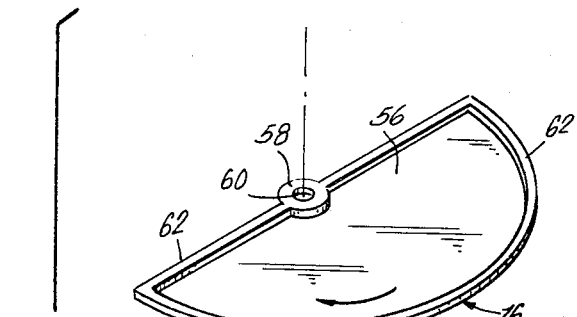
FIG. 1 is an exploded perspective view of a pie and cake divider constructed in accordance with the concept of the present invention.

With continuing reference to the accompanying drawings, wherein like reference numerals designate similar parts through the various views, reference numeral 10 is used to generally indicate the pie and cake divider comprising the present invention. The pie and cake divider includes three major parts, namely a standard 12, a lower plate 14, and an upper plate 16.

The standard 12 includes a thickened portion 14 between the ends 17 and 18. The thickened portion 14 is provided with a collar 20. The lower end 18 is of a conical shape as at 22, while the upper end 17 is provided with a longitudinal slot 24 which extends downwardly and into the thickened portion 14 and terminates just barely above the collar 20. The slot 24 bifurcates the upper end 17 and allows the two bifurcated portions 26 and 28 thereof to be pushed slightly together so that when the bifurcated portions 26 and 28 are pushed together, they will have a resilient spring-like tendency to open and thus clampingly hold any member inserted thereover.

Figure 2:
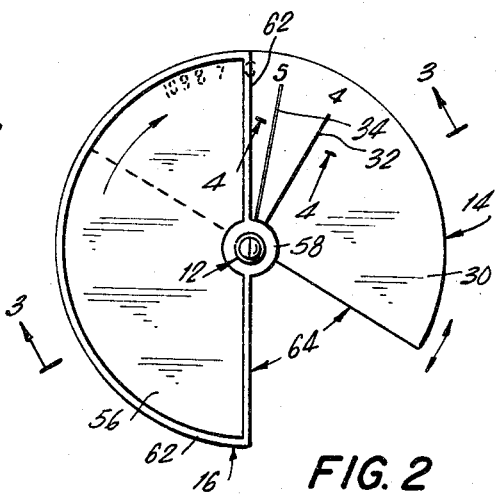
FIG. 2 is a top plan view of the pie and cake divider shown in a position for cutting six (6) portions of pastry of equal size from a pie or cake.
Figure 3:
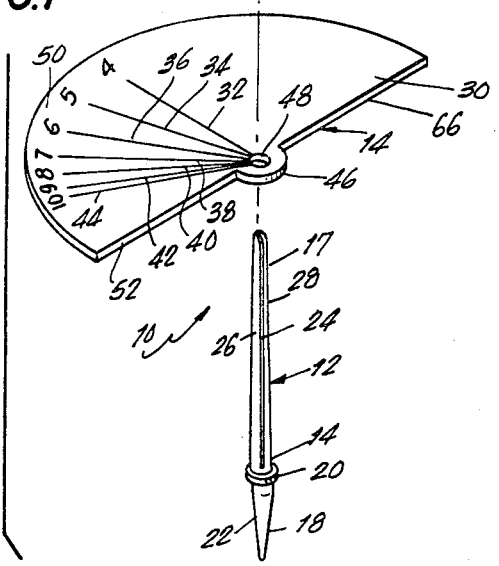
FIG. 3 is a vertical sectional detail view taken along the plane of line 3—3 in FIG. 2.
Figure 3:
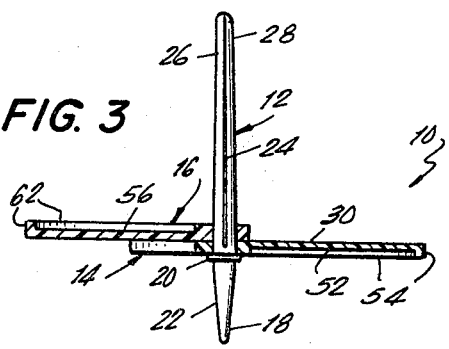
Figure 4:
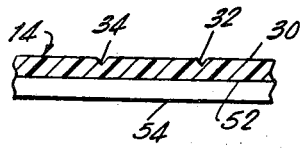
FIG. 4 is an enlarged sectional detail view taken along the plane of line 4—4 in FIG. 2.
Figure 5:
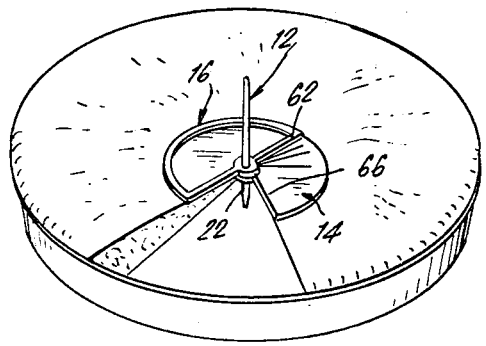
FIG. 5 is a perspective view showing the invention in use for cutting portions of a pie or cake.

The lower plate 14 is of a semi-circular configuration and includes a main plate portion 30 provided with a plurality of indicia 32, 34, 36, 38, 40, 42, and 44 thereon, which are inscribed thereon in the form of grooves extending radially from the geometrical axis of the semi-circular plate 30. The plate 30 is provided with an eye portion 46 through which an aperture 48 coaxial with the center of the semi-circular plate 30 extends. Adjacent the grooves 32 through 44 are indicia generally indicated at 50. The grooves extend at predetermined angles with respect to the edge 52 so as to bear relation to the edge 52 as to the number of portions desired to be cut from a piece of pastry to be divided into 360 degrees. As, for example, the groove 32 is located at right angles, or 90 degrees, with respect to the edge 52 and the indicia 50 opposite this groove is the numeral 4, representing four portions which can be cut into a piece of pastry, each portion having a 90 degree central angle. Another example, as can be best seen in FIG. 2, is with respect to groove 36 which is located at a 60 degree angle with respect to the edge 52 so that six (6) portions of pie or cake can be divided, each having a central angle of 60 degrees. The bottom surface 52 of the plate 30 is provided with a peripheral rib 54, which serves to space the major portion of the surface 32 above the top of the piece of pastry to be divided. The upper plate 16 has a major portion 56 of a generally semi-circular shape and is provided with an eye portion 58 through which an aperture 60 extends coaxial with the center of the semi-circular plate portion 56. The plate 16 is provided with a rib 62 extending about the periphery thereof which facilitates engagement of the plate 56 while strengthening the construction thereof. In use, the first plate 14 is positioned over the standard 12 so as to be resiliently clampingly held in a present angular position on the standard 12. Then, the upper plate 16 is placed over the upper end 17 of the standard 12, the standard being received through the aperture 60 and is freely rotatable with respect to the plate 14 so that the edge 62 thereof cooperates with the respective grooves 32 through 44 in a manner so as to define an open angular intercept 64. This angular intercept 64 corresponds to the center angle of the portion of pastry to be cut. After a first portion is cut, for example, as shown in FIG. 5, the lower plate 14 would then be rotated until the edge 66 thereof is in alignment with the counterclockwise most advanced edge of the pastry being divided. Thereafter, the plate 16 is again positioned so that the edge 62 thereof s in alignment with the selected one of the grooves 32 through 44.

The conical end 22 facilitates rotation of the entire device as successive cuts are being made.

A latitude of modification, substitution and change is intended in the foregoing disclosure, and in some instances, some features of the invention will be employed without a corresponding use of other features. Accordingly, it is appropriate that the appended claim be construed broadly and in a manner consistent with the spirit and scope of the invention herein.

We claim:

1. A pie and cake divider comprising a standard having a lower end for insertion into a pie or cake to be divided and a tapered upper end, said standard having a thickened portion between said upper and lower ends, a first semi-circular plate having an eye for receiving the upper end of said standard and being adjustable with respect to said standard, a second semi-circular plate having eye means rotatably mounting said second plate on said upper end above said first plate so that said second plate is movable with respect to said first plate, said first plate having means including a plurality of spaced radially extending grooves therein at predetermined locations on said first plate for cooperating with said second plate so as to position said second plate relative to said first plate whereby a sector of a predetermined central angle is defined by the relative position of said first plate and second plate so that a pie or cake can be divided into a predetermined number of equal portions, said upper end having a longitudinal slot therein bifurcating said upper end, said first plate being clampingly held in an adjusted position by said bifurcated upper end, said lower end being conical in shape, said thickened portion being provided with a collar, said second plate having a peripheral rib for spacing portions of said second plate above said first plate to facilitate rotation of said second plate, said first plate having a downwardly extending peripheral rib for spacing the major portion of said first plate above the surface of a pie or cake to be divided.

References Cited

UNITED STATES PATENTS

| 583,695 | 6/1897 | Stalons et al. | 33—174 X |
| 1,058,512 | 4/1913 | Aanstoots | 33—75 |
| 1,629,164 | 5/1927 | Hughes | 33—174 X |
| 2,027,198 | 1/1936 | Rappold | 33—174 X |
| 2,555,690 | 6/1951 | Guerra | 33—115 X |

FOREIGN PATENTS

| 1,007,073 | 2/1952 | France. |

SAMUEL S. MATTHEWS, *Primary Examiner.*